United States Patent
Busse

[15] 3,637,266
[45] Jan. 25, 1972

[54] ENDLESS TREAD FOR OFF-HIGHWAY VEHICLES, HAVING NONRIGID ELEMENTS

[72] Inventor: Curtis T. Busse, Busse Bros. Inc., Randolph, Wis. 53956

[22] Filed: Feb. 2, 1970

[21] Appl. No.: 7,646

[52] U.S. Cl. .................................................... 305/35 EB
[51] Int. Cl. ............................................................ B62d 55/24
[58] Field of Search ..................... 305/35 EB, 37, 38, 56, 57, 305/34; 152/219, 218, 221

[56] References Cited

UNITED STATES PATENTS

| | | | |
|---|---|---|---|
| 2,179,587 | 11/1939 | Deardorff | 305/40 |
| 3,276,823 | 10/1966 | Tucker | 305/35 EB |
| 2,376,802 | 5/1945 | Morse | 305/35 EB |
| 1,578,803 | 3/1926 | Comey | 152/221 |
| 2,722,961 | 11/1955 | Eden | 152/218 |
| 2,887,343 | 5/1959 | West | 305/35 EB |

FOREIGN PATENTS OR APPLICATIONS

| | | | |
|---|---|---|---|
| 777,039 | 1/1968 | Canada | 305/35 EB |
| 637,900 | 11/1936 | Germany | 305/35 EB |

*Primary Examiner*—Richard J. Johnson
*Attorney*—Ira Milton Jones

[57] ABSTRACT

A band of supple material—the endless tread proper—is looped around a set of wheels. A looped tensioning cord overlies each face of the wheels, and supple connectors extend from each edge of the band to its adjacent tensioning cord, connectors being anchored to each cord at spaced intervals along it. Elasticity of the cord accommodates changes in anchorage spacing in different parts of the orbit. The cords tension the connectors inwardly of the band loop, over the wheel faces, to keep the tread on the wheels.

7 Claims, 4 Drawing Figures

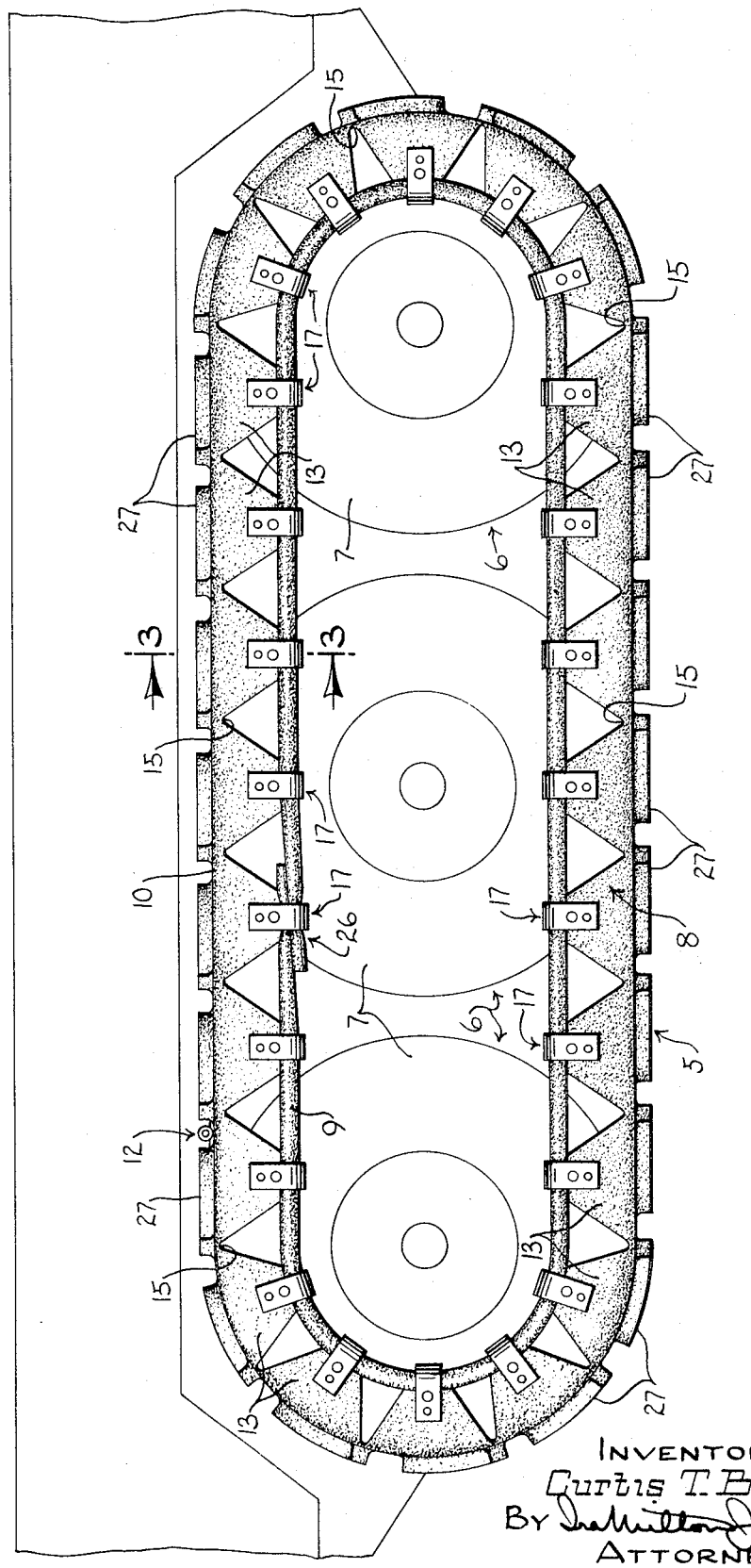

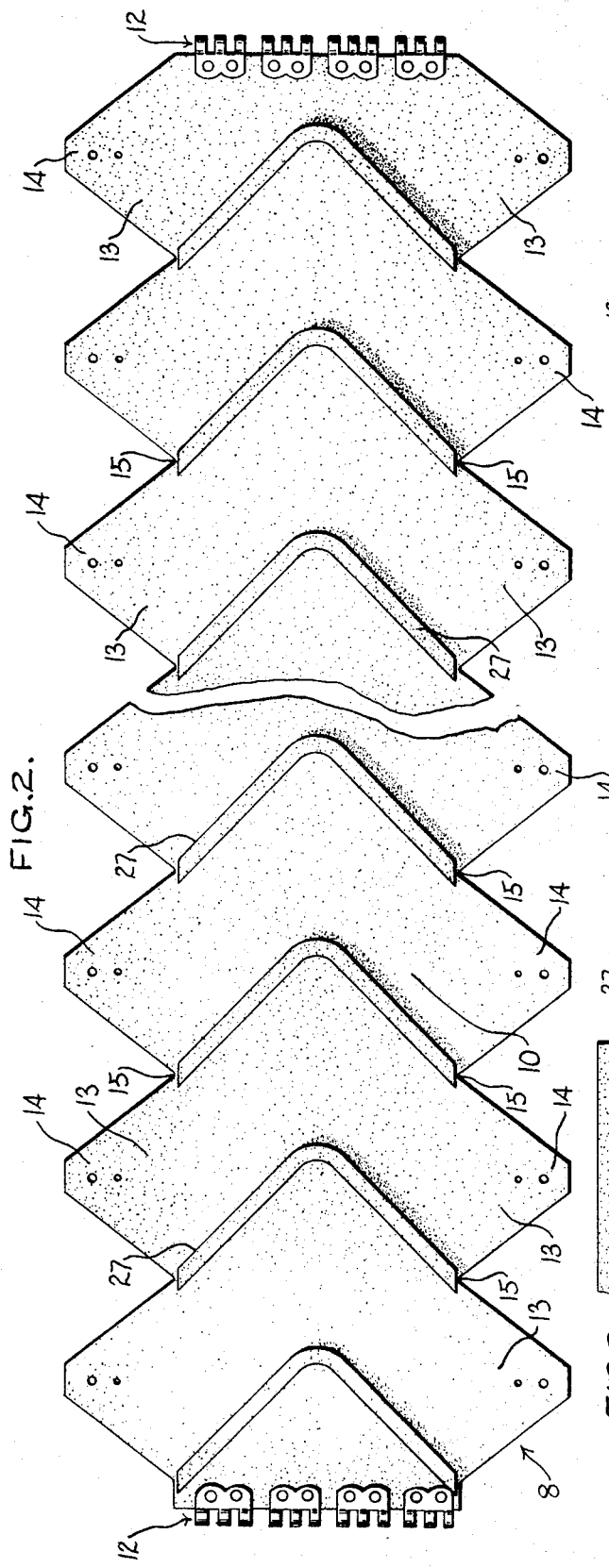
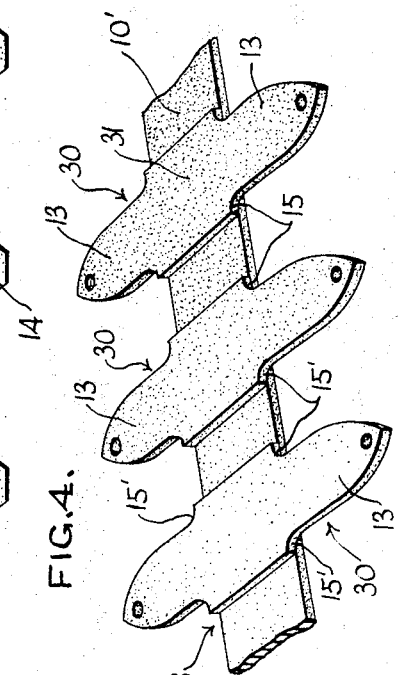
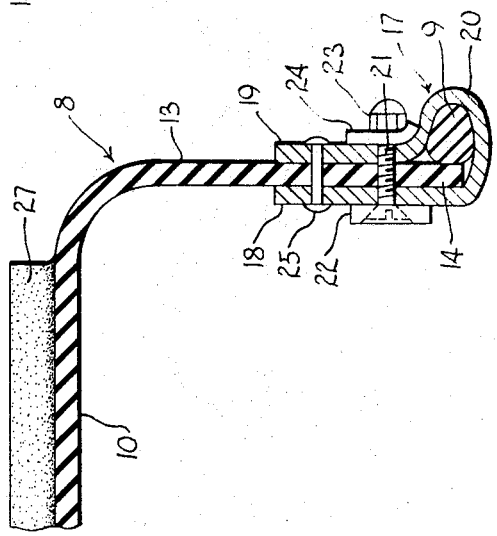

ENDLESS TREAD FOR OFF-HIGHWAY VEHICLES, HAVING NONRIGID ELEMENTS

This invention relates to endless treads for off-highway vehicles, and is more particularly concerned with an endless tread that is substantially entirely of supple but tough material such as rubber and is adapted to be trained around a plurality of wheels that are equipped with rubber tires.

Certain types of light and medium weight off-highway vehicles have wheels on which there are relatively large low-pressure tires that afford fairly good support for the vehicle when it traverses moderately soft surfaces. While such rubber tired wheels are satisfactory for many terrain conditions, they do not have as broad a range of capabilities as an endless tread, and hence the versatility and utility of a vehicle having such wheels could be greatly increased if an endless tread could be installed around its wheels, at least on occasions when the vehicles is going to be driven over an especially soft surface such as now, boggy or swampy terrain, or loose sand.

Heretofore, however, no endless tread was available that was suitable to be trained around wheels having pneumatic tires and which was light and compact enough when off the vehicle so that it could be carried in the vehicle or otherwise conveniently stored. The general object of the present invention is to provide an endless tread that fulfills these requirements.

More specifically, it is an object of this invention to provide an endless tread which is especially suitable for snowmobiles, swamp and dunes vehicles, and similar light and medium weight vehicles intended for off-highway operation on soft surfaces, and which tread is made almost entirely of rubber or the like.

While it is an important object of this invention to provide an endless tread that can be trained around wheels equipped with pneumatic tires, it will be seen as the description proceeds that the endless tread of this invention is by no means limited in its applicability to use with such wheels, it being another general object of this invention to provide a very simple, durable, inexpensive and quiet running endless tread which comprises, in the main, a strip of sheetlike material such as that from which rubber conveyor belts are made, and a pair of elastic loops of rubber cord or similar material.

Thus, while most prior endless treads had rigid tread elements that were hinged together or otherwise articulately connected with one another, the present invention has for its object to provide a tread which comprises an elongated strip of relatively supple material having its opposite ends connected to form a looped band that can be trained around a plurality of wheels; and it is a further object of this invention to provide simple, light, compact and effective means for keeping such a band trained around the wheels with which it cooperates, even under substantial sideward forces such as are exerted when a vehicle carrying the tread moves along the side of a steep hill.

Another specific but very important object of this invention is to provide an endless tread which can be applied to rubber tired vehicles and which tends to rid itself of any snow, sand, vegetation or the like that may tend to accumulate between the tires and the endless tread when the vehicle is in use.

It is also an object of this invention to provide an endless tread which is especially well suited for use on vehicles that must be kept light in weight, such as amphibious vehicles and those that are intended for travel over very soft surfaces.

With these observations and objectives in mind, the manner in which the invention achieves its purpose will be appreciated from the following description and the accompanying drawings, which exemplify the invention, it being understood that such changes in the specific apparatus disclosed herein may be made as come within the scope of the appended claims.

The accompanying drawings illustrate two complete examples of embodiments of the invention constructed according to the best modes so far devised for the practical application of the principles thereof, and in which:

FIG. 1 is a view in side elevation of the lower portion of a vehicle having a set of three rubber tired wheels at each side thereof, with an endless tread embodying the principles of this invention trained around each set of wheels;

FIG. 2 is a developed view of the body member of the endless tread;

FIG. 3 is a fragmentary cross-sectional view on an enlarged scale, taken on the plane of the line 3—3 in FIG. 1; and FIG. 4 is a fragmentary developed perspective view of a modified form of body member of the endless tread.

Referring now to he accompanying drawings, the numeral 5 designates generally an endless tread embodying the principles of this invention and which is illustrated in FIG. 1 as trained around a set of three wheels 6 at one side of an off-highway vehicle. The wheels 6 are shown as equipped with oversize, low pressure, extrawide-tread tires 7 such as are typically employed for off-highway vehicles other than tractors. It will be understood that the vehicle has at its other side a similar set of wheels, around which a similar endless tread is trained, and that all three wheels in each set may be driven or certain of them can be idlers. As is conventional in such arrangements, none of the wheels is steerable but, instead, directional control of the vehicle is effected by varying the relative speeds of the two sets of wheels.

The endless tread 5 comprises simply a body member 8 that can be made in one piece, a pair of looped elastic tensioning cords 9, and certain anchorages described hereinafter.

In contrast to most prior endless treads, the body member 8 of the endless tread of this invention comprises no rigid elements. Instead, it can be made entirely of a supple but tough sheetlike material such as the fabric-reinforced rubber sheet or strip material used for conveyor belts. In planform it is essentially an elongated strip with uniform cutouts at regular intervals along its opposite longitudinal edges, as best seen in FIG. 2, where the body member is illustrated as a one-piece unit.

The medial portion of the body member, which comprises and elongated strip or band 10, constitutes the tread proper and has a width substantially equal to the tread width of the tires and a length such that it can be looped around a set of wheels with its ends in close proximity to one another. The contiguous ends of the looped band portion 10 are articulately connected, as by means of a hingelike conveyor belt connector 12.

The cutouts along the sides of the body member define supple tablike connecting members 13 which extend laterally from each longitudinal edge of the looped band portion 10 and are arranged in laterally opposite pairs. The tabs or connecting members 13 connect the looped band portion 10 with the two tensioning cords 9. In the one-piece body member illustrated in FIG. 2, the connecting members 13 are in the form of triangular scallops or serrations, each having an apex or tip portion 14 which is spaced from the band portion 10 and which is anchored to a tensioning cord 9. Adjacent edges of neighboring scallops meet at rounded corners 15 which are tangent to the longitudinal edges of the band portion 10.

It will be evident that the body member shown in FIG. 2 can be formed by simply making substantially triangular cutouts at regular lengthwise intervals along the side edges of rectangular blank to define the serrations or scallops 13. However, as explained hereinafter, the connecting members need not be integral with the band; but if they are not, it is important that the bondings or connections between the connecting members and the medial band portion 10 be secure ones, particularly in zones adjacent to the junctions between the band portion and the laterally extending edges of the connecting members, since the body member tends to be subjected to certain tearing forces in these zones, as explained hereinafter. If the connecting members are formed as scallops integral with the band portion of the body member, the corners at the junctions between the side edges of the scallops 13 and the side edges of the band portion 10 should be so shaped as to minimize tearing stresses, as with the small radius rounded corners 15 in FIG. 2.

When the endless tread of this invention is on the vehicle, the connecting members 13 at opposite sides of the band portion 10 extend inwardly of the band loop to overlie opposite sidewalls of the tires. There is a tensioning cord 9, which can be of heavy duty rubber, overlying each face of the set of wheels, and the connecting members 13 at each side of the set of wheels are all connected to their adjacent tensioning cord to be thereby strongly tensioned inwardly relative to the band loop. With the connecting members under such radially inward tension they cooperate with the sidewalls or side surfaces of the tires in resisting sideward displacement of the endless tread off of the wheels around which it is trained. To insure maintenance of such tension on the connecting members, the looped elastic tensioning cords 9 must obviously be under a substantial tension preload.

The apexes or tip portions 14 of lengthwise adjacent connecting members are spaced apart along the tensioning cord, and each is so securely anchored to its tensioning cord as to prevent any relative displacement lengthwise of the cord between the cord and the connecting member. An expedient for effecting such anchorage that has been found satisfactory in practice is illustrated in FIG. 3. It comprises a U-shaped strap 17 of flat belting material, having its legs 18 and 19 flatwise overlying the opposite surfaces of the connecting member and having its bight portion 20 so tightly embracing the tensioning cord at the outer face of the connecting member as to compress the cord and locally elastically deform it. To provide for the clamping of the cord in this manner, a bolt 21 passes through the two legs of the strap directly adjacent to the cord. To prevent the bolt from scuffing the tires, its head is countersunk in a large washer 22 that overlies the inner leg 18 of the strap. A self-locking nut 23 is threaded onto the bolt at the outside of the connecting member and bears against a washer 24 to confine the latter against the outer leg 19 of the strap. The washer 24 is preferably bent out of flatness so that it conforms to the bulge of the bight portion of the strap, where the same embraces the elastic cord, and thus transfers evenly to the cord the clamping and deforming force exerted by the nut 23 and bolt 21. To insure a good connection between each connecting member and its strap 17, one or more rivets 25 can be fastened through the two legs of the strap and the connecting member, at a location or locations spaced from the tensioning cord.

The opposite end portions of the tensioning cord can be overlappingly confined in a single anchorage, as at 26, to effectively connect them and form the cord into a loop.

As the tread moves orbitally from either of its straight stretches to go around one of the end wheels of the set, there must of course be some decrease in the circumferential distances between the apex or tip portions 14 of lengthwise adjacent connecting members. The preload of the tensioning loop cord is relied upon to accommodate this change and to maintain the proper relative positions of the connecting member anchorages in all portions of their orbits, in addition to its above-explained function of preventing displacement of the endless tread off of the wheels. For adequate tensioning of the connecting members, and to maintain the proper relative positioning of their tip portions, the tensioning loop cord, when installed, should be stretched to 30 to 50 percent longer than its relaxed length. It will be appreciated that for installation of the endless tread of this invention on a vehicle, a winch, a suitable jack or jacks, or similar equipment will be useful for stretching the inside tensioning cord to get it over a set of wheels.

As the endless tread moves around the end wheels of the set, through the curved portion of its orbit, most of the flexing of its band or tread portion 10 takes place substantially along lines connecting laterally opposite corners 15, since the connecting members 13 tend to stiffen the band portion against such flexing. It is with this in mind that the connecting members are arranged laterally opposite one another. However, not all of the flexing takes place on the lines just mentioned, and therefore a small amount of puckering develops in the body member, in the neighborhood of each of the corners 15, in the curved portions of the tread orbit. While such puckering tends to impose a somewhat concentrated stress on the body member at each of the pucker zones, such stresses are by no means excessive if the body member is properly designed, and the condition is mentioned here only to emphasize that attention should be given to said corners 15 in the design of an endless tread embodying the principles of this invention.

To increase the tractive efficiency of the endless tread, chevron cleats 27 can be molded or otherwise provided on the outer surface of the band portion 10 of the body member. Of course the cleats should not extend across the lines that connect laterally opposite corners 15, for if they did so they would interfere with flexing of the band portion 10. However, the cleats can have their ends so arranged near the corners 15 as to provide a measure of reinforcement at the stressed zones.

Desirably the endless tread of this invention is trained around wheels having tires with resilient chevron cleats, so that the tire cleats provide a space between the main tread surface of the tire and the inner surface of the band portion 10, through which space mud, snow and other foreign matter that is caught between the tires and the tread can make its way to the spaces between connecting members. To facilitate expulsion of foreign matter out through the spaces or cutouts between connecting members, those cutouts should be deep enough so that the band portion 10 is not excessively bowed in cross section, which is again to say that the band portion 10 should have a width about equal to the tread width of the tire or the thickness of the wheels.

Because a specific example may facilitate an understanding of the more important dimensional relationships in the endless tread of this invention, the relative proportions and dimensions that have been found successful in one case are here given solely by way of illustration. A vehicle on which endless treads of this invention were installed had a set of three wheels on each side, each wheel having a commercial chevron cleated 26 × 12 × 12 inch tire, and the wheels were on horizontally aligned centers spaced-apart 27 to 30 inches. Gross weight of the vehicle was roughly 3,000 lbs.

The material of the body member 8 of each endless tread was conveyor belt sheeting having a thickness and construction generally similar to those of an automobile tire carcass, but flat. The form of the body member was as shown in FIG. 2 and the rectangular blank from which it was cut was 16 feet by 20 inches wide. The cutouts between the scallops 13 were 4½ inches deep, and the tips of the scallops were on 8 inch centers. The medial band or strip 10 that provided the tread proper was 11 inches wide, and it had ⅝ × ⅝ inch chevron cleats molded to its outer surface. Its ends were connected by standard "Flex-Co" belt connectors.

Both ¾ inch and 1 inch heavy duty rubber cord were used for the tensioning loops 9 with good results, but the thinner cord had to be stretched more than the 1 inch material, to insure that it would adequately tension the connecting members. The 1 inch cord was considered preferable. The relaxed length of the 1 inch rubber cord was about 9 feet. The anchorages 17 were made of 1 inch wide three-ply flat belting material. The depth of the connecting members was chosen to dispose the tensioning cords at about 30 to 40 percent of the wheel radius from the wheel axes, and this relationship was found very satisfactory. With tabs or scallops 13 of lesser depth, the tread would have had a tendency to run off the wheels; with longer tabs the tensioning cords would have been too short to provide enough stretch and contraction to tension the tabs adequately.

No slippage was noticed between the wheels and the tread just described. The chevron-shaped cleats on the commercial tires not only afforded good traction between the tires and the endless tread but also discouraged accumulations of foreign matter between the tires and the endless tread, rapidly displacing mud, snow and the like toward the cutouts between scallops and expelling it through them.

In the modified embodiment of the invention illustrated in FIG. 4 the connecting members 13 comprise transverse strips 30 which are vulcanized or otherwise bonded to the outer surface of a simply rectangular medial strip or band 10' at spaced intervals along its length. The medial portion 31 of each transverse strip 30, which overlies the band 10', is wider than its end portions, which project laterally beyond the band to provide the connecting members 13, the change in width of the transverse strip 30 being at concavely curved edges 15' which tend to distribute and minimize the tearing forces mentioned above, to prevent such forces from being concentratedly applied to the bond between the band 10' and the transverse strip. It will be noted that the medial portion 31 of each transverse strip 30 serves as a cleat or lug that increases the tractive friction of the endless tread.

The connecting members 13 of the FIG. 4 embodiment can of course have the same type of anchorages to their tensioning cords as are described above.

From the foregoing description taken with the accompanying drawings it will be apparent that this invention provides a lightweight, inexpensive and quiet running endless tread which is especially suited for lightweight and medium-weight off-highway vehicles having rubber tires.

Those skilled in the art will appreciate that the invention can be embodied in forms other than as herein disclosed for purposes of illustration.

The invention is defined by the following claims:

1. An endless tread for a set of wheels, comprising:
   A. a tread band of tough, supple material having a width substantially equal to the thickness of the wheels and which is in an endless loop to be trained around the wheels;
   B. a plurality of supple tablike members extending inwardly of the tread band loop from each edge of the tread band to overlie opposite faces of the wheels,
      1. the inner ends of adjacent tablike members that extend from each edge of the tread band being spaced from one another in the direction around the loop, and
      2. the connections of the tablike members to the tread band being such as to resist movement of their inner ends relative to the tread band in directions around the loop; and
   C. yielding tension means connecting the inner end portion of each tablike member with the inner end portions of its adjacent tablike members that extend from the same edge of the band,
      1. the tablike members being so anchored to the tension means as to be confined against displacement relative thereto, and changes in the spacing between connected tablike members in different parts of their orbit being accommodated by yielding expansion and contraction of the tension means, and
      2. said tension means being substantially free to move in directions inwardly and outwardly relative to the tread band loop and thus cooperating with the tablike members to tension all of them inwardly relative to the tread band loop so that they prevent displacement of the endless tread off of the wheels.

2. An endless tread comprising:
   A. a tread band of tough, supple material which is in an endless loop to be trained around a set of wheels and which has a width substantially equal to the thickness of the wheels;
   B. a plurality of supple, substantially flat tablike members connected with each edge of the tread band and extending inwardly of the tread band loop to be substantially coplanar with one another, the inner ends of adjacent coplanar tablike members being spaced apart in the direction of the loop;
   C. yielding tension means connected between the inner ends of each tablike member and of its adjacent coplanar tablike members to tension all of the coplanar tablike members inwardly relative to he tread band loop so that they prevent displacement of the endless tread off of the wheels, said tension means being substantially free to move in and out relative to the tread band loop; and
   D. anchorage means so securing each tablike member to the tension means connected therewith as to preclude relative displacement between the tablike member and the tension means so that changes in the spacings between the inner ends of adjacent coplanar tablike members in different parts of their orbit are accommodated by tension and yielding of the tension means.

3. The endless tread of claim 2, further characterized by:
   A. said tread band and said tablike members being integral with one another; and
   B. said tablike members being substantially triangular with their apexes remote from the tread band.

4. The endless tread of claim 2, further characterized by:
   the tension means connected with the tablike members that extend from each edge of the tread band comprising a loop of rubber cord.

5. Means for maintaining a looped band trained around a plurality of wheels at one side of a vehicle so that it provides an endless tread, said means comprising:
   A. a pair of tensioning loops of elastic cordlike material, one adapted to overlie each face of the wheels, and each having a periphery substantially smaller than that of the band;
   B. a set of supple connecting members extending from near each edge of the band to its adjacent tensioning loop, the connecting members of each set extending inwardly of the band loop a distance to maintain the tensioning loop under peripheral tension and being the sole support for it so that the connecting members are in turn tensioned inwardly over the wheel faces by the tensioning loop; and
   C. anchorage means securing the inner ends of the connecting members of each set to their tensioning loop in spaced-apart relationship and by which the connecting members of the set are confined against motion relative to the tensioning loop along the same, elastic expansion and contraction of the tensioning loop accommodating changes in the spacings of said anchorages as they move through different parts of their orbits.

6. An endless tread to be trained around a set of substantially coplanar wheels, comprising:
   A. a body member of tough, supple sheetlike material having
      1. A medial striplike portion with a width substantially equal to the thickness of the wheels and a length to loop around the wheels with its opposite ends closely adjacent to one another, and
      2. a plurality of scalloplike opposite tabs extending uniform distance laterally from each longitudinal edge of the medial portion to overlie opposite faces of the wheels, the tips of adjacent tabs at each face of the wheels being spaced from one another lengthwise of the medial portion;
   B. means connecting the opposite ends of the medial portion to maintain it in a closed loop;
   C. a pair of looped elastic tensioning cords, one for the tabs overlying each face of the wheels; and
   D. anchorage means connecting the tip of each tab with its tensioning cord and by which the tensioning cord is held closely adjacent to the tip of the tab, the tensioning cord being otherwise unsupported so as to be under lengthwise tension whereby the tabs are tensioned inwardly relative to the looped medial portion and prevent displacement of the endless tread off of the wheels, said anchorage means confining each tab against relative displacement lengthwise of its tensioning cord so that elastic expansion and contraction of the tensioning cord accommodates changes in the spacing of the tips of the tabs connected therewith in different parts of the orbit of the tabs.

7. Means for maintaining a looped endless tread band trained around a set of substantially coplanar wheels at one side of a vehicle, said means comprising:
   A. a plurality of substantially flat, supple tablike members connected with the tread band near each edge thereof and extending inwardly of the tread band loop, 1. each tablike member near one edge of the tread band being laterally opposite a tablike member near the other edge thereof,
2. the inner ends of lengthwise adjacent tablike members being spaced from one another, and
3. the connections of the tablike members to the tread band being such as to resist edgewise movement of the tablike members relative to the tread band;

B. yielding tension means connecting the inner end portion of each tablike member with the inner end portions of its lengthwise adjacent tablike members,
1. the tablike members being so anchored to the tension means as to be confined against displacement relative thereto, and changes in the spacing between the inner ends of lengthwise adjacent tablike members, in different parts of their orbit, being accommodated by yielding expansion and contraction of the tension means, and
2. said tension means being under tension in all parts of its orbit and being supported only by its connections with the tablike members to tension all of the tablike members inwardly relative to the tread band loop and thus prevent displacement of the endless tread off of the wheels.

* * * * *